United States Patent
Seetharaman et al.

(10) Patent No.: US 12,431,154 B2
(45) Date of Patent: Sep. 30, 2025

(54) TRAINING MACHINE LEARNING FRAMEWORKS TO GENERATE STUDIO-QUALITY RECORDINGS THROUGH MANIPULATION OF NOISY AUDIO SIGNALS

(71) Applicant: Descript, Inc., San Francisco, CA (US)

(72) Inventors: Prem S. Seetharaman, Sacramento, CA (US); Kundan Kumar, Montreal (CA)

(73) Assignee: Descript, Inc., San Francisco, CA (US)

( * ) Notice: Subject to any disclaimer, the term of this patent is extended or adjusted under 35 U.S.C. 154(b) by 297 days.

(21) Appl. No.: 18/154,707

(22) Filed: Jan. 13, 2023

(65) Prior Publication Data

US 2023/0230609 A1 Jul. 20, 2023

Related U.S. Application Data

(60) Provisional application No. 63/299,790, filed on Jan. 14, 2022.

(51) Int. Cl.
*G10L 21/0232* (2013.01)
*G06F 3/16* (2006.01)
*G10L 15/06* (2013.01)
*G10L 25/18* (2013.01)
(Continued)

(52) U.S. Cl.
CPC .......... *G10L 21/0232* (2013.01); *G06F 3/165* (2013.01); *G10L 15/063* (2013.01); *G10L 25/18* (2013.01); *G10L 25/21* (2013.01); *G10L 25/30* (2013.01)

(58) Field of Classification Search
CPC ... G10L 21/003; G10L 21/0232; G10L 21/02; G10L 25/21; G10L 15/063
See application file for complete search history.

(56) References Cited

U.S. PATENT DOCUMENTS

| 10,440,498 B1 | 10/2019 | Amengual et al. |
| 10,897,675 B1 * | 1/2021 | Tsitovich ................. G06N 3/08 |
| 11,170,761 B2 | 11/2021 | Thomson et al. |

(Continued)

FOREIGN PATENT DOCUMENTS

WO WO-2024054556 A2 * 3/2024 ........... G06N 3/0475

OTHER PUBLICATIONS

Kong, Jungil et al., "HiFi-GAN: Generative Adversarial Networks for Efficient and High Fidelity Speech Synthesis", Oct. 23, 2020, arXiv, p. 3-5. (Year: 2020).*

*Primary Examiner* — Richemond Dorvil
(74) *Attorney, Agent, or Firm* — Perkins Coie LLP; Andrew T. Pettit; Willa Wu

(57) ABSTRACT

Introduced here are computer programs and associated computer-implemented techniques for manipulating noisy audio signals to produce clean audio signals that are sufficiently high quality so as to be largely, if not entirely, indistinguishable from "rich" recordings generated by recording studios. When a noisy audio signal is obtained by a media production platform, the noisy audio signal can be manipulated to sound as if recording occurred with sophisticated equipment in a soundproof environment. Manipulation can be performed by a model that, when applied to the noisy audio signal, can manipulate its characteristics so as to emulate the characteristics of clean audio signals that are learned through training.

21 Claims, 13 Drawing Sheets

(51) Int. Cl.
    *G10L 25/21*    (2013.01)
    *G10L 25/30*    (2013.01)

(56) References Cited

U.S. PATENT DOCUMENTS

| | | |
|---|---|---|
| 11,514,925 B2 | 11/2022 | Jin et al. |
| 12,001,950 B2 | 6/2024 | Zhang et al. |
| 12,322,380 B2 * | 6/2025 | Agostinelli ............. G10L 13/00 |
| 2016/0111107 A1 * | 4/2016 | Erdogan ................ G10L 25/03 |
| | | 704/226 |
| 2018/0366138 A1 * | 12/2018 | Ramprashad ....... G10L 21/0208 |
| 2019/0237065 A1 * | 8/2019 | Xue ........................ G10L 15/22 |
| 2020/0066250 A1 * | 2/2020 | Morita ............... G06Q 30/0283 |
| 2020/0335086 A1 | 10/2020 | Paraskevopoulos et al. |
| 2021/0217404 A1 * | 7/2021 | Jia ........................... G10L 17/04 |
| 2021/0217431 A1 * | 7/2021 | Pearson ................ G10L 21/013 |
| 2021/0366461 A1 | 11/2021 | Ahmed et al. |
| 2022/0165250 A1 * | 5/2022 | Kang ..................... G10L 25/45 |
| 2022/0253678 A1 * | 8/2022 | Han ....................... G06N 3/048 |
| 2023/0300532 A1 | 9/2023 | Spittle |

\* cited by examiner

Descript  File  Edit  Tour  Format  View  Window  Decentral  Help

The Tenderloin – Edited

Highlighters ˅

Scenes
★ Main Script
☐ Felicia Interview 1
☐ Felicia Interview 2
☐ Felicia Transcript  ← Storage Space 314
☐ Kathy Interview § Transcript – Felicia 1m45s :

Can you just are quite using yourself tell me your name and um can you say welcome to the ten freeway. [Hi my name is felicia elizondo out. Am also known escalation play games i miss screaming clean up pioneer allege an icon i do have a twenty seven years survivor of aids and of vietnam veteran and welcome to the tender line.] Okay. I didn't know that you have these. Yes i've been a h._i._v. positive since nineteen eighty seven. I'm up. Twenty seven twenty eight years now. You know yeah um. Well he was amazing well thank you uh. It just that um. And i sometimes wonder why i've lived this long. Because all my friends in my generation. Pop up and it's already gone. And. Uh i. Sometimes things why am i still here since all my friends are gone within a year or two years that they were diagnosed. And i was diagnosed in nineteen eighty seven so. It's kind of travelling but i mean. Any anything after the the first year that i was diagnosed as the bonus to me i wake up and say. God has extended me all these years. To educate the lesbian and gay community about our history and about being a survivor of aids. Um ten you you start off i tell i tell i live live it about um the first time you came to san francisco actually tell me where you're from and then tell me that about what brought you to san francisco in the.

Transcript – Felicia

FIGURE 3C

Transcript 316

| Descript  File  Edit  Tour  Format  View  Window  Decentral  Help |
| --- |

The Tenderloin -- Edited

Scenes
- Felicia Interview 1
- Main Script
- Felicia Interview 2
- Felicia Transcript
- Kathy Interview Highlighters 1m13s — Okay, let's turn around now and keep walking down the hill the same direction as before.

Glide is run by Reverend Cecil Williams… when he took over the church in the '60s he pretty much redefined what being a minister was all about. He invited all the poorest, sickest people in the neighborhood to church. And Glide became a big part of the counterculture and a place to organize against Vietnam. he was pro-gay rights from the very beginning… held a gay ball in the '60s and performed gay weddings long before it was legal.

That street up ahead… that's Eddy st. Cross it when you can, and keep walking.

-20s — I wasn't here back then, but I know the Tenderloin was important to gays and lesbians. I know someone who lived that story. Felicia Flames. I'll hand you off to her up here.

| Felicia: Hi my name is felicia elizondo. Am also known escalation play games i miss screaming clean up pioneer legent icon i do have a twenty seven years survivor of aids and of vietnam veteran and welcome to the tender line.

-4s — Approaching Eddy
(AMBI) Hi, (END) This is Eddy Street. Go ahead and cross.

-26s — Eddy & Taylor
(AMBI) (MUS) (IMG) Eddy Street should be behind you. Keep walking down the block.

CVS on Market

FIGURE 3D

Transcript 316

Descript  File  Edit  Tour  Format  View  Window  Decentral  Help

The Tenderloin – Edited ~

Highlighters ~

Scenes
★ Main Script
  ☐ Felicia Interview 1
  ☐ Felicia Interview 2
  ☐ Felicia Transcript
  ☐ Kathy Interview 1m14s  redefined what being a minister was all about. He invited all the poorest, sickest people in the neighborhood to church. And Glide became a big part of the counterculture and a place to organize against Vietnam. he was pro-gay rights from the very beginning… held a gay ball in the '60s and performed gay weddings long before it was legal.

That street up ahead… that's Eddy st. Cross it when you can, and keep walking.

-21s  I wasn't here back then, but I know the Tenderloin was important to gays and lesbians. I know someone who lived that story. Felicia Flames. I'll hand you off to her up here. [Keep walking straight.]

■ 4s  | Felicia: Hi my name is felicia elizondo out. Am also known escalation play games i miss screaming clean up pioneer legent icon i do have a twenty seven years survivor of aids and of vietnam veteran and welcome to the tender line.

-26s  ● Approaching Eddy
(AMBI)  Hi, (END)  This is Eddy Street. Go ahead and cross.

● Eddy & Taylor
(AMBI)  (MUS)  (IMG)  Eddy Street should be behind you. Keep walking down the block.

One thing you have to understand is that the Tenderloin history has been lost for 40 years. It wasn't in the newspaper. It wasn't on television. But the Tenderloin was the gay mecca of San Francisco. People used to come from all over the United States, and they had friends that, that left back home Location Name

FIGURE 3E

Script 7 takes ▼ Alright you should bebe | Middle Point walking down a very Steep Hill.| I'll be honest with you I only ever walk down this hill. It's too steep.|

— Dialogue Line 320

1. [Alright you should be] walking no excuse me. Alright you should be on Middle Point walking down a very Steep Hill. I'll be honest, I only ever walk down this hill.|

2. |Alright you should be walking down Middle Point Road. Very. No I'm sorry I called the middle bull run but that's okay 3. alright you should be walking down Middle Point. A very steep hill I'll be honest with you I only ever walk down it until it's too steep for me.

4. Alright you should be walking down Middle Point a very Steep Hill I'm here on this with you.

5. |Alright you should be on [Middle Point walking down a very steep hill] I'll be honest with you I only ever walk down this hill. It's too steep.

6. [I'll be honest with you I only ever walk down this hill is too steep.]

7. I only ever walk down this hill it's too steep.

Takes 322

401
Receive input indicative of an instruction to generate a model

402
Obtain a vocoder that is able to transform a frequency representation of an audio signal into a corresponding waveform

403
Generate, based on the vocoder, an inverse vocoder that is able to transform a waveform into a frequency representation of a corresponding audio signal

404
Concatenate the inverse vocoder and vocoder in a machine learning framework, so as to generate the model

405
Store the model in a memory

FIGURE 4A

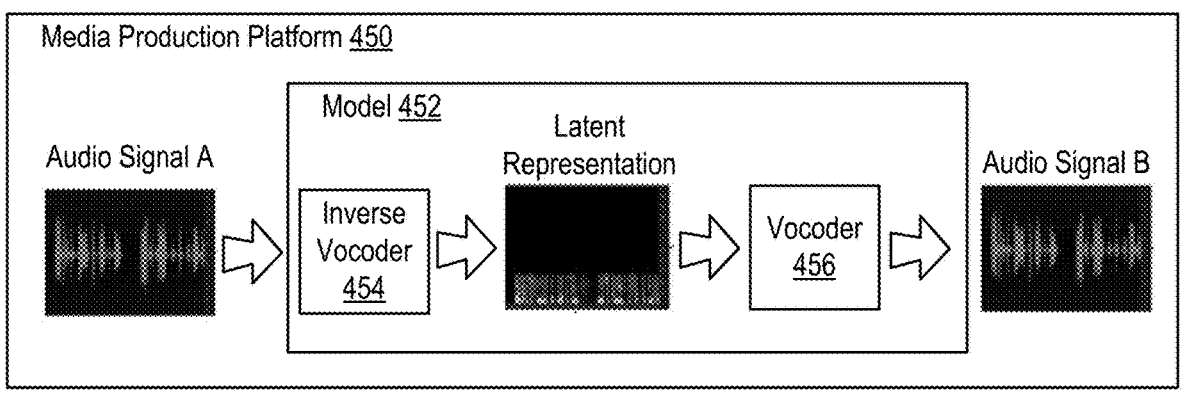

501
Concatenate an inverse vocoder and vocoder in a machine learning framework, so as to generate an untrained model 502
Train the untrained model to mitigate noise in audio signals provided as input through transformation of those audio signals from the time domain into the frequency domain and then back to the time domain

601
Receive input indicative of a request to mitigate the noise included in a first recording that includes speech uttered by a first speaker 602
Generate a series of recordings by combining a second recording that includes speech uttered by a second speaker with a noise source in different ways 603
Train a model to mitigate noise in noisy audio signals that are provided as input by providing the series of recordings to the model as training data 604
Store the trained model in a memory

Receive input indicative of an intent to use a noisy audio signal that includes speech uttered by a speaker in the production of a media compilation

702

Obtain the noisy audio signal

703

Apply, to the noisy audio signal, a model that is trained to mitigate noise, so as to produce a clean audio signal

704

Store the clean audio signal in a memory

705

Cause display of a notification that indicates the model has output the clean audio signal

Determine that a noisy audio signal that includes speech uttered by a speaker is to be included in a media compilation

802

Apply a machine learning framework that is representative of a model to the noisy audio signal, so as to produce a cleaner version of the noisy audio signal that has less noise

803

Permit the clean version of the noisy audio signal to be included in the media compilation

FIGURE 8

TRAINING MACHINE LEARNING FRAMEWORKS TO GENERATE STUDIO-QUALITY RECORDINGS THROUGH MANIPULATION OF NOISY AUDIO SIGNALS

CROSS-REFERENCE TO RELATED APPLICATIONS

This application claims priority to U.S. Provisional Application No. 63/299,790, titled "Training Machine Learning Frameworks to Generate Studio-Quality Recordings Through Manipulation of Noisy Audio Signals" and filed on Jan. 14, 2022, which is incorporated by reference herein in its entirety.

TECHNICAL FIELD

Various embodiments concern computer programs and associated computer-implemented techniques for manipulating audio signals to produce high-quality recordings.

BACKGROUND

Recording studios are specialized facilities designed for recording, mixing, and producing the sounds produced during vocal performances. Vocal performances can take various forms, from musical sessions that include instrumental sounds in addition to vocal sounds, to vocal sessions that only include vocal sounds. Recording studios can range in size from small studios that have enough room for a single performer to large studios that have enough room for dozens or hundreds of performers.

Recording studios, especially larger ones, tend to have separate spaces for recording and monitoring. These spaces—referred to as the "recording space" and "monitoring space," respectively—may be specially designed to achieve optimum acoustic properties. For example, these spaces may be designed for acoustic isolation, or these spaces may be designed for acoustic absorption of reflected sound echoes that would otherwise interfere with the quality of recordings.

Historically, recording studios have been used to produce high-quality recordings with good richness. The term "richness," as used herein, may be used to refer to recordings in which sounds of interest are clear and undistorted. "Rich" recordings generally are not too bassy and have little distraction (e.g., static, noise, and the like). Moreover, "rich" recordings tend to be sharp in the sense that there is little audible bleeding between words. Said another way, there tends to be good cutoff between words in "rich" recordings.

BRIEF DESCRIPTION OF THE DRAWINGS

FIG. 3C illustrates how files can be stored as separate documents in a storage space.

FIG. 3D illustrates how an individual can select a segment of a transcript for the purpose of altering the corresponding audio waveform.

FIG. 3E illustrates how an individual can copy a segment of a transcript and then paste the copied segment into another transcript, another location in the transcript, etc.

FIG. 3G illustrates how multiple takes of the same line of dialogue may be separately shown and numbered.

FIG. 4A depicts a flow diagram of a process for generating a model that can be used to improve the quality of audio signals that contain speech.

FIG. 4B includes a high-level illustration that shows how a model—like the one generated in accordance with the process of FIG. 4A—can take a first audio signal as input and produce a second audio signal with higher quality as output.

FIG. 5 depicts a flow diagram of a process for developing a trained model that is able to mitigate noise in a noisy audio signal provided as input.

FIG. 6 depicts a flow diagram of another process for training a model that can be used to improve the quality of audio signals that contain speech.

FIG. 7 depicts a flow diagram of a process for implementing a model that is designed and trained to mitigate noise in audio signals.

FIG. 8 includes a flow diagram of a process for implementing a machine learning framework that is representative of a model to mitigate noise in a noisy audio signal.

Figure 1:
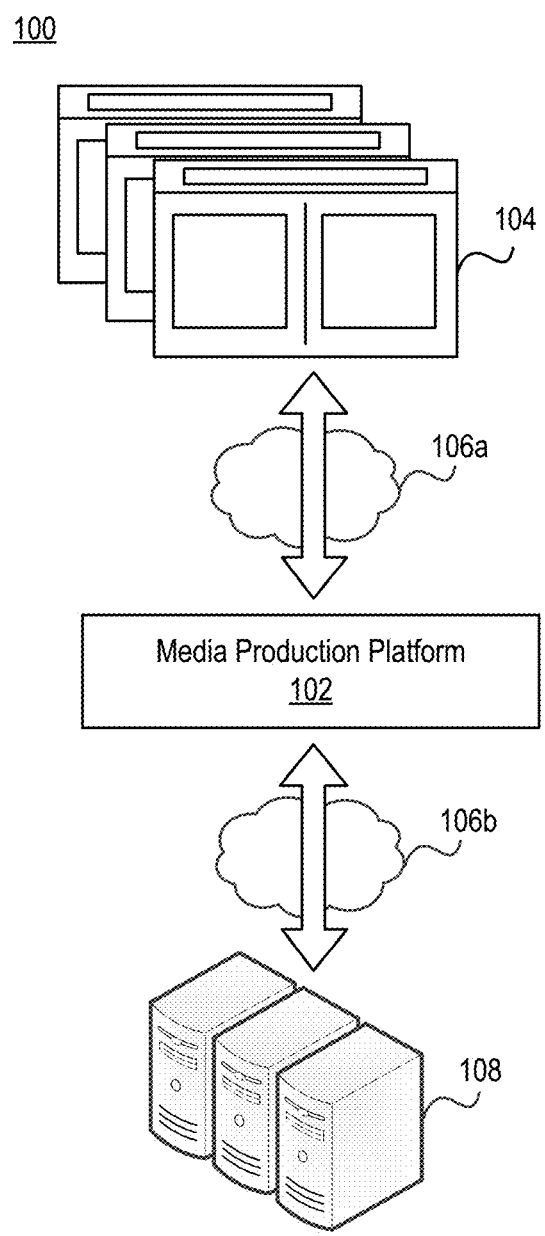
FIG. 1 illustrates a network environment that includes a media production platform.

Features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the present disclosure. Accordingly, although specific embodiments are shown in the drawings, the technology is amenable to various modifications.

DETAILED DESCRIPTION

"Rich" recordings are useful in various contexts, from producing music to capturing dialogue (e.g., for films, advertisements, podcasts, etc.). While smaller recording studios (also called "personal recording studios") may be suitable for some tasks, the sophisticated equipment needed to generate "rich" recordings has traditionally been found in larger recording studios. Simply put, the sophisticated equipment is normally too costly for individuals to purchase for personal recording studios.

Consequently, individuals have historically needed to visit larger recording studios in order to participate in the production process. These individuals could be voiceover artists, musicians, and the like. It is often impractical or impossible to visit these larger recording studios, however. For example, individuals located in remote areas may not have access to a larger recording studio. Even if a larger recording studio is nearby, visiting may be costly in terms of time and resources. For example, an individual may spend several hours traveling to and from a larger recording studio in order to participate in a relatively short recording session.

Overview of Approach to Generating High-Quality Recordings

Introduced here are computer programs and associated computer-implemented techniques for manipulating audio signals to produce recordings that are sufficiently high quality so as to be largely, if not entirely, indistinguishable from "rich" recordings generated by recording studios. As further discussed below, when an audio signal is obtained by a media production platform that is representative of a computer program, the audio signal can be manipulated to sound as if recording occurred with sophisticated equipment in a soundproof environment. The manipulated audio signal may be referred to as a "studio sound file" or "studio audio file." There are several concepts that can be implemented by the media production platform to generate studio sound files.

First, the media production platform—sometimes simply called the "platform" or "program"—can utilize a "flipped vocoder" approach. The term "vocoder" refers to a category of voice codec that analyzes and synthesizes voice signals for audio data compression, multiplexing, encryption, or transformation. At a high level, a vocoder converts a representation of audio—usually including speech—into a listenable, comprehensible waveform. Said another way, a vocoder may successively upsample a downsampled latent space representation of audio, where fine details of speech can be added to the representation by various layers—the last one or more of which decode the upsampled representation to clean speech. For example, a vocoder may obtain, as input, a spectrogram that tracks energies at audible frequencies over time and then convert the spectrogram into a waveform. In some embodiments, the spectrogram is a mel spectrogram in which the energies at audible frequencies are converted to the mel scale. Additionally or alternatively, the vocoder could be designed to utilize other features like linguistic information, speaker identity, and the like. Vocoders are often implemented as one of the last parts of text-to-speech systems.

To produce studio sound files, the media production platform can acquire "noisy" audio signals and then output "clean" audio signals. In the present disclosure, the terms "noisy audio signal" and "noisy audio" may be used to refer to an audio signal that includes audible noise, while the terms "clean audio signal" and "clean audio" may be used to refer to an audio signal that is substantially devoid of audible noise. One way to accomplish this is to take a software-implemented vocoder (also called a "vocoder program" or "vocoder software") that is configured to take a given form of representation (e.g., a discrete audio signal) as input and convert that representation into a waveform and then "flip" the software-implemented vocoder around, such that it instead takes a waveform as input and then outputs a representation in the given form. These two vocoders can then be concatenated together. Assume, for example, that the "forward" vocoder (i.e., that produces waveforms as output) and the "reverse" vocoder (i.e., that produces representations as output) are representative of machine learning models (or simply "models") that are able to learn how to implement the respective transformations. In such a scenario, these models can simply be concatenated together to form a larger model (also called a "superset model") that takes a first waveform as input, converts the first waveform into a representation, and then converts the representation into a second waveform.

The nature of the models that comprise the superset network are not particularly important. Any high-performance vocoder could be selected or utilized by the media production platform, so long as that vocoder can be "flipped" as discussed above. To ensure that the vocoder can be "flipped," the media production platform may review a vocoder to ensure that its underlying code is separately addressable and manipulable, such that its underlying code can be rearranged to form the "reverse" vocoder without issue.

At a high level, the superset model is representative of a machine learning framework comprised of different collections of algorithms adapted to perform different tasks (e.g., produce a waveform given a representation as input or produce a representation given a waveform as input). One example of a machine learning framework is a generative adversarial network ("GAN") that is comprised of a pair of artificial neural networks (or simply "neural networks"). The term "neural network" refers to a collection of algorithms that learns by processing examples, each of which contains a known input and output, to form probability-weighted associations between those elements. Neural networks can "learn" how to produce an appropriate output given an input without being manually programmed with rules.

Second, the media production platform can train the superset model. Assume, for example, that the superset model is a GAN. GANs are algorithmic architectures that use a pair of neural networks, one of which may be called a "generator network" or "generator" and another of which may be called an "encoder network" or "encoder," which are pitted against one another—thus the "adversarial"—in order to generate new synthetic data that can pass for real data. Accordingly, the media production platform may train the superset model to mimic the distribution of data normally found in high-quality audio in an adversarial manner. To ensure good performance, the media production platform may utilize two loss functions (also called "losses"), namely, an adversarial loss and a reconstruction loss, during the training process.

The adversarial loss can comprise several discriminators, each of which is in the waveform domain. More specifically, the adversarial loss may comprise a multi-period discriminator and a single-scale discriminator. The multi-period discriminator may look at samples at a predetermined cadence or frequency. For example, the multi-period discriminator may look at every sample, every other sample, or every fifth sample output by the superset model. Meanwhile, the single-scale discriminator may look at every sample output by the superset model.

The media production platform can compare the features of the multi-period discriminator and single-scale discriminator determined for one or more audio signals that include authentic speech and one or more audio signals that include generated speech. The generated speech could be created by the media production platform, or the generated speech could be created by another computer program. Through this comparison, the multi-period discriminator and single-scale discriminator can be trained to distinguish authentic speech (also called "real speech") from generated speech (also called "fake speech"). This encourages the generator to output high-quality audio. Note that in the present disclosure, the terms "noisy speech signal" and "noisy speech" may be used to refer to a noisy audio signal that includes speech, while the terms "clean speech signal" and "clean speech" may be used to refer to a clean audio signal that includes speech.

Additionally or alternatively, the media production platform could employ a spectrogram discriminator (or simply "discriminator"). Using spectrograms rather than audio signals as input, the media production platform could generate high-resolution signals by utilizing a discriminator that employs spectrograms as input.

The reconstruction loss may be used by the media production platform to stabilize the training process. The actual function of the reconstruction loss used to train the superset model may be dependent on the nature of its input and output. For example, the function may differ based on whether the superset model is designed and then trained to take waveforms or spectrograms as input and produce waveforms or spectrograms as output. The use of reconstruction loss can greatly speed up the time it takes to train the superset model to produce studio sound files.

The media production platform can balance how the adversarial and reconstruction losses are combined in a unique manner. More specifically, the media production platform may re-weight the loss values so that each term—namely, the adversarial loss, reconstruction loss, and feature matching loss—contributes equally to the final loss term.

Third, the media production platform can intelligently simulate recording in recording studios using a room simulator module (also called a "simulating module" or "simulator"). Normally, the simulator is executable by the media production platform. However, the simulator could instead be accessible to the media production platform. For example, the simulator could be representative of a separate computer program that is executed by the same computing device as the media production platform. As another example, the simulator could be representative of a separate computer program that is executed by a different computing device than the media production platform.

At a high level, the simulator may be designed to generate training data that is intended to be comparable to studio recordings from a quality perspective. The training data could be generated "on the fly" (i.e., in real time) in response to a determination by the media production platform that such data is needed.

In operation, the simulator can take, as input, an audio signal with clean speech, a noise source (e.g., an environmental soundscape or room tone), and an impulse response. Then, the simulator can perform frequency-band filtering on the noise source and impulse response. More specifically, the simulator can perform frequency-band filtering so as to equalize the noise source and impulse response with the audio signal. Moreover, the simulator can augment the impulse response, so as to make the impulse response target specific direct-to-reverberant ratios. Augmentation of the impulse response may allow the audio signal to be altered such that it sounds as if it was recorded in a larger or smaller room. Augmentation can be thought of as an approach to control the distance between the virtual microphone that is responsible for recording the audio signal and the speaker responsible for uttering the clean speech. Thereafter, the simulator can convolve the audio signal with the augmented impulse response, so as to produce a convolved audio signal. This has the effect of making the speech included in the audio signal sound like it was recorded in the physical environment (e.g., the room) that the augmented impulse response is intended to represent. The media production platform can then combine or mix the convolved audio signal with the noise source, so as to create the final audio signal that can be used for training purposes.

As further discussed below, the media production platform can create studio sound files utilizing these three concepts. In particular, the media production platform can be trained to output clean audio by examining and then manipulating noisy audio that is provided as input. However, rather than focusing on filtering, dampening, or otherwise modifying noises from the noisy audio, the media production platform can instead learn the characteristics of clean audio and then determine how to manipulate noisy audio accordingly. Learning from noisy audio would result in the superset model learning the characteristics of noisy audio. This approach—namely, learning the characteristics of clean audio—can result in fewer artifacts and sharper cutoffs (e.g., clearer enunciation between phonemes and entire words).

For the purpose of illustration, embodiments may be described in the context of improving the quality of audio including human voices. However, those skilled in the art will recognize that the approaches described herein may be similarly applicable to other audio domains. As an example, the media production platform could implement the approaches described herein to produce studio sound files from lower quality recordings of musical performances on the street or in the home. Accordingly, the approaches described herein are not limited to improving the sound quality of speech.

Note that while embodiments may be described in the context of computer-executable instructions for the purpose of illustration, aspects of the technology can be implemented via hardware, firmware, software, or any combination thereof. As an example, a media production platform may be embodied as a computer program through which an individual may be permitted to review content to be incorporated into a media compilation (or simply "compilation"), to create compilations by compiling different forms of content or multiple files of the same form of content, and to initiate playback or distribution of compilations. The content could include text, audio, still images, moving images (e.g., in the form of a video), or combinations thereof.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

The term "based on" is to be construed in an inclusive sense rather than an exclusive sense. That is, in the sense of "including but not limited to." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, logical, or a combination thereof. For example, elements may be electrically or communicatively connected to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing multiple tasks.

When used in reference to a list of items, the word "or" is intended to cover all of the following interpretations: any of the items in the list, all of the items in the list, and any combination of items in the list.

The term "media compilation" or simply "compilation" may refer broadly to content that is produced by assembling previously separate content. For the purpose of illustration, a compilation may generally be described as an assembly of multiple audio files, some or all of which may be studio sound files that are created in accordance with the approach described herein. One example of a compilation is a podcast that is generated by combining a first audio file (or segments thereof) that includes speech of a first individual with a second audio file (or segments thereof) that includes speech of a second individual. Note, however, that a compilation could include text, still images, or moving images (e.g., in the form of a video) in addition to audio. Accordingly, an advertisement with either still images or moving images overlaying audio could be representative of another example of a compilation.

The terms "studio sound files" and "studio audio files" may refer to audio files that either already have largely or entirely inaudible levels of noise (e.g., because those audio files were recorded in a recording studio) or have been created in accordance with the approach described herein. Accordingly, the terms "studio sound files" and "studio audio files" may refer to audio files that are naturally high quality or have been manipulated such that the quality is improved.

The terms "high-quality recording" and "high-quality audio" may refer broadly to audio files in which noise is largely or entirely inaudible to the human ear, or at least is sufficiently low that the noise does not meaningfully affect comprehensibility of the signal.

Overview of Media Production Platform

FIG. 1 illustrates a network environment 100 that includes a media production platform 102. Individuals (also referred to as "users" or "developers") can interact with the media production platform 102 via interfaces 104 as further discussed below. For example, individuals may be able to generate, edit, or view media content (or simply "content") through the interfaces 104. Examples of content include text content such as stories and articles, audio content such as radio segments and podcasts, image content such as still images, and video content such as television programs and presentations. Meanwhile, the individuals may be persons interested in recording media (e.g., audio content) or editing media (e.g., to create a podcast or audio tour).

As shown in FIG. 1, the media production platform 102 may reside in a network environment 100. Thus, the computing device on which the media production platform 102 is executing may be connected to one or more networks 106a-b. The network(s) 106a-b can include personal area networks ("PANs"), local area networks ("LANs"), wide area networks ("WANs"), metropolitan area networks ("MANs"), cellular networks, the Internet, etc. Additionally or alternatively, the computing device can be communicatively coupled to other computing device(s) over a short-range wireless connectivity technology, such as Bluetooth®, Near Field Communication ("NFC"), Wi-Fi® Direct (also referred to as "Wi-Fi P2P"), and the like. As an example, the media production platform 102 is embodied as a "cloud platform" that is at least partially executed by a network-accessible server system in some embodiments. In such embodiments, individuals may access the media production platform 102 through computer programs executing on their own computing devices. For example, an individual may access the media production platform 102 through a mobile application, desktop application, over-the-top ("OTT") application, or web browser. Accordingly, the interfaces 104 may be viewed on personal computers, tablet computers, mobile phones, wearable electronic devices (e.g., watches or fitness accessories), network-connected electronic devices (also called "smart electronic devices") such as televisions or home assistant devices, gaming consoles, virtual or augmented reality systems (e.g., head-mounted displays), and the like.

In some embodiments, at least some components of the media production platform 102 are hosted locally. That is, part of the media production platform 102 may reside on the computing device that is used to access the interfaces 104. For example, the media production platform 102 may be embodied as a desktop application executing on a personal computer. Note, however, that the desktop application may be communicatively connected to a network-accessible server system 108 on which other components of the media production platform 102 are hosted.

In other embodiments, the media production platform 102 is executed entirely by a cloud computing service operated by, for example, Amazon Web Services®, Google Cloud Platform™, or Microsoft Azure®. In such embodiments, the media production platform 102 may reside on a network-accessible server system 108 comprised of one or more computer servers. These computer servers can include media and other assets, such as digital signal processing algorithms (e.g., for processing, coding, or filtering audio signals), heuristics (e.g., rules for determining whether to improve the quality of incoming audio signals, rules for determining the degree to which the quality of incoming audio signals should be improved), and the like. Those skilled in the art will recognize that this information could also be distributed amongst a network-accessible server system and one or more computing devices. For example, content may be stored on a personal computer that is used by an individual to access the interfaces 104 (or another computing device, such as a storage medium, that is accessible to the personal computer) while digital signal processing algorithms may be stored on a computer server that is accessible to the personal computer via a network.

As further discussed below, the media production platform 102 can facilitate the production of studio-quality recordings (also called "studio sound files" or "studio audio files") through the application of a trained model on waveforms corresponding to lesser quality recordings. Generally, these waveforms are obtained by the media production platform 102 in the form of audio files. Thus, an individual may be able to select an audio file and then specify that quality of the audio file should be improved. Alternatively, upon receiving input indicative of a selection of an audio file, the media production platform 102 may automatically improve its quality in response to determining that its quality (e.g., as measured in clarity, signal-to-noise ratio, etc.) either falls beneath a threshold or is meaningfully less than other audio files to be included in the same media compilation. In some embodiments, the media production platform 102 is programmed to automatically improve the quality of all audio files that are selected, identified, or otherwise made available for inclusion in media compilations by the media production platform 102.

Figure 2:
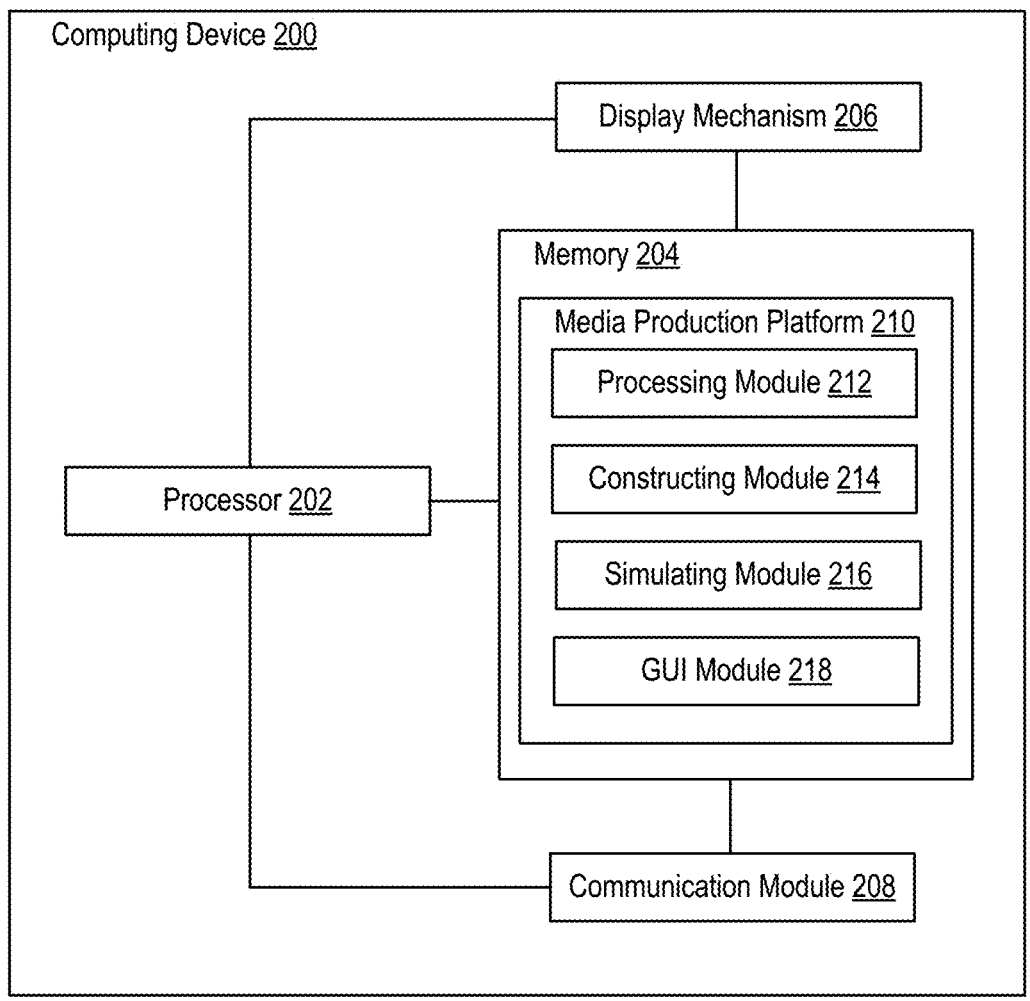
FIG. 2 illustrates an example of a computing device able to implement a media production platform through which individuals may be able to record, produce, deliver, or consume media content.

FIG. 2 illustrates an example of a computing device 200 able to implement a media production platform 210 through which individuals may be able to record, produce, deliver, or consume content. For example, in some embodiments the media production platform 210 is designed to generate interfaces through which developers can generate or produce content, while in other embodiments the media production platform 210 is designed to generate interfaces through which consumers can consume content. In some embodiments, the media production platform 210 is embodied as a computer program that is executed by the computing device 200. In other embodiments, the media production platform 210 is embodied as a computer program that is executed by another computing device (e.g., a computer server) to which the computing device 200 is communicatively connected. In such embodiments, the computing device 200 may transmit relevant information, such as content created, recorded, or otherwise acquired by the individual, to the other computing device for processing. Those skilled in the art will recognize that aspects of the computer program could also be distributed amongst multiple computing devices.

The computing device 200 can include a processor 202, memory 204, display mechanism 206, and communication module 208. The communication module 208 may be, for example, wireless communication circuitry designed to establish communication channels with other computing devices. Examples of wireless communication circuitry include integrated circuits (also referred to as "chips") configured for Bluetooth, Wi-Fi, NFC, and the like. The processor 202 can have generic characteristics similar to general-purpose processors, or the processor 202 may be an application-specific integrated circuit ("ASIC") that provides control functions to the computing device 200. As shown in FIG. 2, the processor 202 can be coupled to all components of the computing device 200, either directly or indirectly, for communication purposes.

The memory 204 may be comprised of any suitable type of storage medium, such as static random-access memory ("SRAM"), dynamic random-access memory ("DRAM"), electrically erasable programmable read-only memory ("EEPROM"), flash memory, or registers. In addition to storing instructions that can be executed by the processor 202, the memory 204 can also store data generated by the processor 202 (e.g., when executing the modules of the media production platform 210). Note that the memory 204 is merely an abstract representation of a storage environment. The memory 204 could be comprised of actual memory chips or modules.

The communication module 208 can manage communications between the components of the computing device 200. The communication module 208 can also manage communications with other computing devices. Examples of computing devices include mobile phones, tablet computers, personal computers, and network-accessible server systems comprised of one or more computer servers. For instance, in embodiments where the computing device 200 is associated with a developer, the communication module 208 may be communicatively connected to a network-accessible server system on which processing operations, heuristics, and algorithms for producing content are stored. In some embodiments, the communication module 208 facilitates communication with one or more third-party services that are responsible for providing specified services (e.g., transcription or speech generation). The communication module 208 may facilitate communication with these third-party services through the use of application programming interfaces ("APIs"), bulk data interfaces, etc.

For convenience, the media production platform 210 may be referred to as a computer program that resides within the memory 204. However, the media production platform 210 could be comprised of software, firmware, or hardware implemented in, or accessible to, the computing device 200. In accordance with embodiments described herein, the media production platform 210 may include a processing module 212, constructing module 214, simulating module 216, and graphical user interface ("GUI") module 218. These modules may be an integral part of the media production platform 210. Alternatively, these modules may be logically separate from the media production platform 210 but operate "alongside" it. Together, these modules enable the media production platform 210 to generate and then support the interfaces through which an individual can create, record, edit, or consume content.

The processing module 212 may be responsible for ensuring that data obtained (e.g., retrieved or generated) by the media production platform 210 is in a format suitable for the other modules. Thus, the processing module 212 may apply operations to alter content obtained by the media production platform 210. For example, the processing module 212 may apply denoising, filtering, and/or compressing operations to content obtained by the media production platform 210. As noted above, content could be acquired from one or more sources. The processing module 212 may be responsible for ensuring that these data are in a compatible format, temporally aligned, etc.

As further discussed below, the constructing module 214 may design, develop, or train a model that takes a first waveform as input, converts the first waveform into a representation, and then converts the representation into a second waveform. This model may be representative of a concatenation of multiple models, and therefore may be referred to as a "superset model." More specifically, this model may include (i) a first set of algorithms—representative of a first model—that is able to produce the representation from the first waveform and (ii) a second set of algorithms—representative of a second model—that is able to produce the second waveform from the representation. As discussed above, the first model may be representative of a "reverse" vocoder while the second model may be representative of a "forward" vocoder.

At a high level, the superset model is representative of a machine learning framework that includes the first and second models. The constructing module 214 may not only be responsible for developing the superset model, but also the first and second models. For example, the constructing module 214 may be responsible for identifying a "forward" vocoder that can be used as the second model and then developing an appropriate "backward" vocoder based on the "forward" vocoder. The constructing module 214 may identify the "forward" vocoder from amongst a series of "forward" vocoders based on the desired capabilities of the superset model. For example, the "forward" vocoder could be identified based on a desired quality (e.g., in terms of signal-to-noise ratio, gain, or some other characteristic) of the "clean" audio to be output by the superset model.

In some embodiments, the constructing module 214 is responsible for training the superset model. Assume, for example, that the superset model is representative of a GAN. In such a scenario, the constructing module 214 can train the superset model in an adversarial manner, namely, with a generator and an encoder. To ensure good performance, the constructing module may utilize two losses, namely, an adversarial loss and a reconstruction loss, during the training process. Training is discussed in further detail below.

In other embodiments, a separate module may be responsible for training the superset model designed, developed, or otherwise obtained by the constructing module 214. This other module may be referred to as a "training module." The training module could be part of the media production platform 210, or the training module may be accessible to the media production platform 210. For example, the training module may be executed by another computing device to which the computing device 200 is communicatively connected.

Accordingly, the constructing module 214 may be responsible for designing, developing, or training (e.g., in conjunction with the training module) the superset model that is applied by the simulating module 216. Assume, for example, that the media production platform 210 acquires input indicative of a request to improve the quality of a first audio file. Upon acquiring the input, the simulating module 216 can acquire the first audio file. In some embodiments, the first audio file is included in the input. For example, a user may upload the first audio file to the media production platform 210 through an interface that is generated by the GUI module 218, and the act of uploading the first audio file may be indicative of the input. In other embodiments, the first audio file is referenced in the input. For example, the input may reference the name of the first audio file, a speaker whose voice is included in the first audio file, or a media compilation that the first audio file is to be used to create. In embodiments where the first audio file is referenced in the input, the simulating module 216 may acquire the first audio file. For example, the simulating module 216 may retrieve the first audio file from the memory 204, or the simulating module 216 may retrieve the first audio file from another memory that is accessible (e.g., by the communication module 208) via a network.

The simulating module 216 can then apply the superset model to the first audio file, so as to produce a second audio file as output. As further discussed below, applying the superset model to the first audio file may result in manipulation of the underlying audio signal. The underlying audio signal can be manipulated to sound as if recording occurred with sophisticated equipment in a high-quality recording studio. As such, the second audio file may be referred to as a "studio sound file" or "studio audio file." Studio sound values obtained by the simulating module 216 through application of the superset model can be stored in the memory 204 or another memory external to the computing device 200. In some embodiments, studio sound files are stored in data structures that correspond to media compilations. For example, each studio sound file may be stored in a data structure maintained for a media compilation in which that studio sound file is to be used.

The GUI module 218 may be responsible for generating the interfaces through which users can interact with the media production platform 210. As shown in FIGS. 3A-G, these interfaces may include visual indicia representative of the audio files (e.g., studio sound files) that can be used to create a media compilation, or these interfaces may include a transcript that can be edited to globally effect changes to a corresponding media compilation. For example, if a user deletes a segment of a transcript that is visible on an interface, the media production platform 210 may automatically delete a corresponding segment of audio content from an audio file (e.g., a studio sound file) associated with the transcript.

FIGS. 3A-G depict examples of interfaces that enable an individual to readily produce high-quality media compilations. These interfaces—which are created by a media production platform—may enable nearly anyone who understands how to use a word processor to produce content that is suitable for professional applications. Moreover, the media production platform can support powerful features that can be used to create media compilations, manipulate content, incorporate consumer feedback, and ensure these interfaces are readily comprehensible and easy to use.

Examples of media compilations include location-based experiences involving audio content and/or video content, podcasts, audiobooks, radio segments, television segments, presentations, and the like. These powerful features are enabled by higher-level, content-based editing tools rather than the lower-level, waveform-based editing tools used by conventional digital audio workstations ("DAWs"). The media production platform may also be designed to facilitate simultaneous collaboration between multiple developers, as well as multiple consumers who may simultaneously consume media compilations produced by those developers.

Figure 3A:
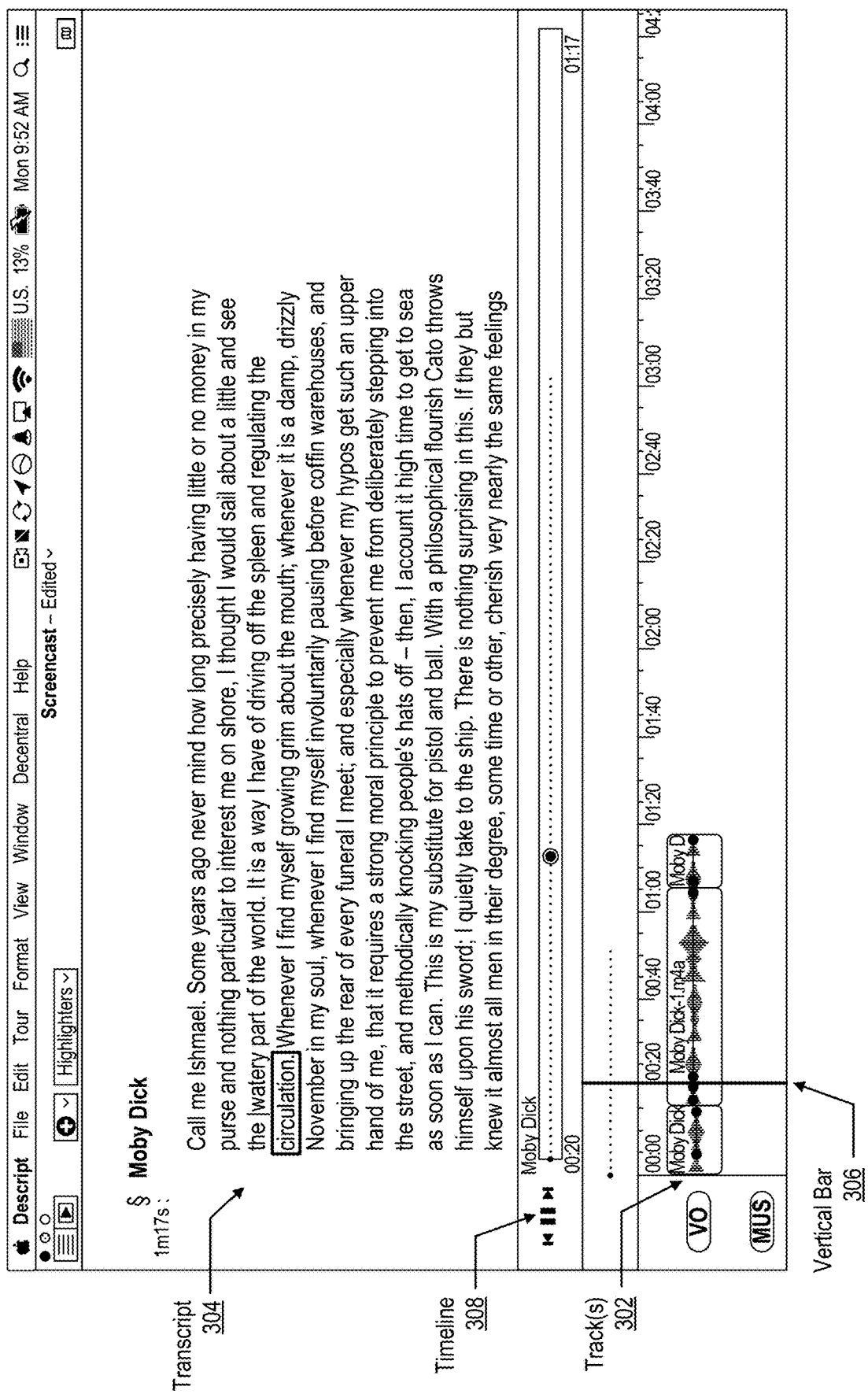
FIG. 3A depicts an example of an interface that includes multiple windows for producing media content.

As shown in FIG. 3A, an interface may include multiple windows for producing media compilations. Production may involve creating and/or editing content. For example, one or more tracks 302 corresponding to audio file(s) could be presented in one window, while a transcript 304 of words recognized in the audio file(s) could be presented in another window. The track(s) 302 may be separately or collectively editable. The media production platform may also be able to intelligently switch between multiple tracks based on whether certain criteria are satisfied, much like a video game engine. For example, the media production platform may determine whether certain condition(s) are met for playing a particular audio file. As another example, the media production platform may determine whether an individual has begun editing a portion of the transcript corresponding to a particular audio file.

Interfaces with multiple windows can easily align content for post-processing, editing, etc. Alignment can also be permitted between content of different formats (e.g., audio and text). For example, when an individual modifies a transcript (e.g., by copying a segment of a transcript and pasting it to a different location), the media production platform may cause the change to be reflected globally. That is, the media production platform may effect an identical or similar modification to an audio file associated with the transcript. Such action may be performed periodically or continually. For example, the media production platform may continually monitor the transcript (or the corresponding audio file) for changes so long as available bandwidth and/or connectivity status meets a specified threshold. Should these measure(s) fall below the specified threshold, the media production platform may periodically query whether any modifications have been made to the transcript (or the corresponding audio file).

In some embodiments, visual cues are used to indicate the current position in the transcript 304 and/or the track(s) 302. Here, for example, the media production platform has highlighted the word corresponding to the current position in the transcript and created a vertical bar 306 that overlays the track(s) 302. Other examples of visual cues include underlining the word corresponding to the current position, changing the color of the word corresponding to the current position, and placing an animated feature (e.g., a moving sphere) near the word corresponding to the current position. A timeline 308 may indicate the total duration of the media compilation, as well as provide a visual representation of progress.

Figure 3B:
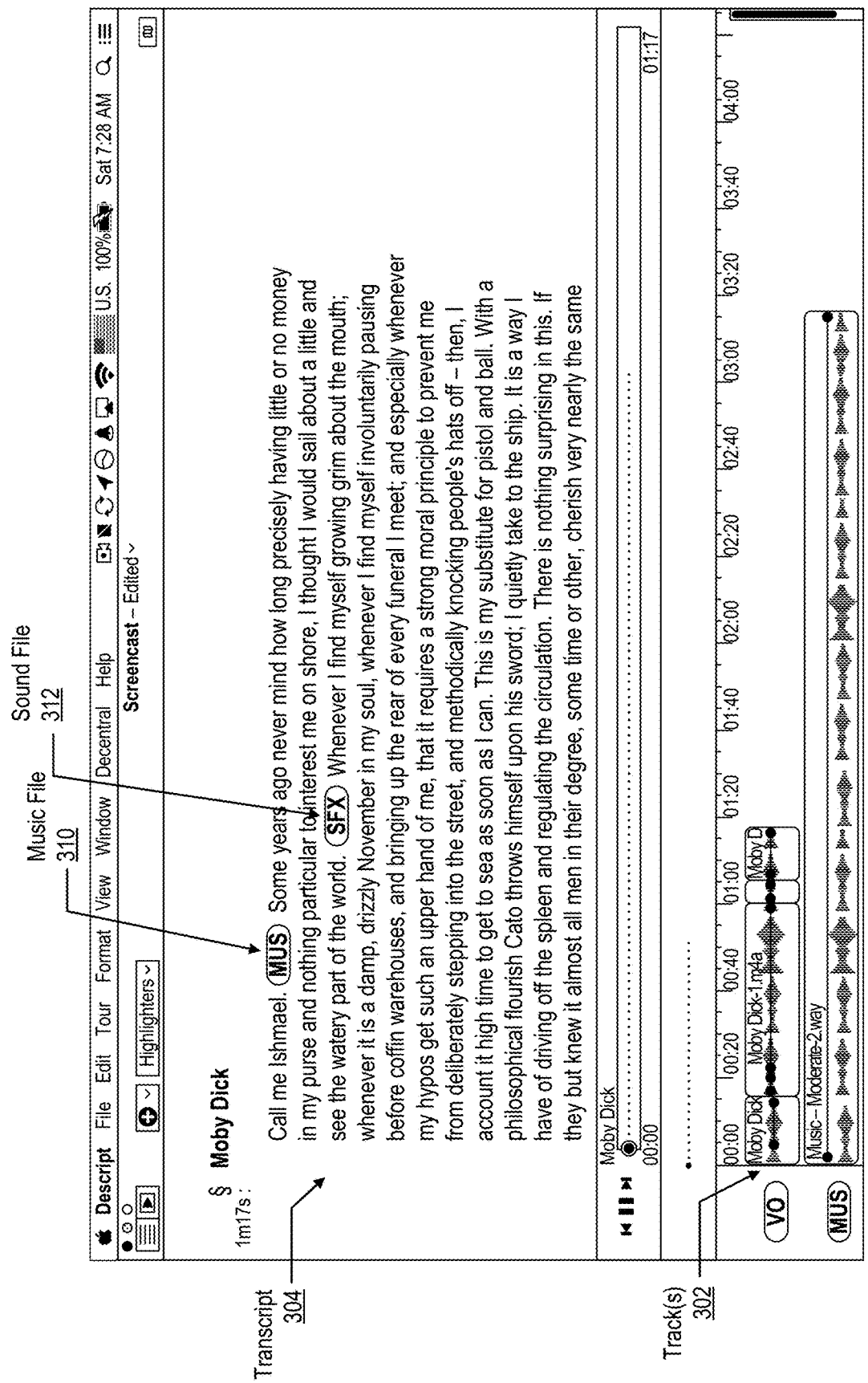
FIG. 3B depicts an example of an interface that may facilitate in-line, multi-track sequencing of the content within windows shown on the interface.

As shown in FIG. 3B, an interface may also facilitate in-line, multi-track sequencing of content in the windows shown on the interface. In some embodiments, all of the windows on the interface are dynamically linked together (e.g., on a phoneme level or a word level). In other embodiments, only some of the windows on the interface are dynamically linked together. Various mechanisms, such as a drag-and-drop mechanism, may allow audio files to be selected or placed directly where a user would like the sound to play. Here, for example, a music file 310 has been placed in the transcript 304 such that the music will begin playing after the word "Ishmael" has been uttered. Similarly, a sound file 312 has been placed in the transcript 304 such that the sound effect will begin playing after the word "world" has been uttered.

After an audio file has been placed in the transcript 304, a waveform corresponding to the audio file may be automatically placed along one of the track(s) 302 in the waveform window. When the audio file is moved within the transcript 304 (e.g., due to being dragged from one location to another location), the media production platform can ensure that the corresponding waveform moves along the track as well. As noted above, the transcript 304 and the audio file(s) arranged along the track(s) 302 are normally synced with one another so that changes made to one can be propagated across the other by the media production platform in real time.

A user may be able to separately edit the audio file(s) arranged along the track(s) 302 from within the waveform window. For example, the user may be able to modify the duration of an audio file (e.g., by cutting material), set fades, and perform other operations without leaving the interface.

As shown in FIG. 3C, files can be stored as separate documents within a storage space 314 (also referred to as a "workspace"). Examples of files include text files (e.g., transcripts), audio files (e.g., voiceover recordings), and video files. In some embodiments, the storage space 314 is associated with a particular media compilation. Accordingly, only those files related to the particular media compilation may be shown within the storage space 314. Here, for example, four separate files (i.e., Felicia Interview 1, Felicia Interview 2, Felicia Transcript, and Kathy Interview) are associated with a single media compilation, namely, a guided audio tour of the Tenderloin neighborhood of San Francisco, California. The four separate files include three audio files (i.e., Felicia Interview 1, Felicia Interview 2, and Kathy Interview) and one text file (i.e., Felicia Transcript). In some embodiments, the storage space 314 is segmented into a first space that includes "rough" or "raw" content and a second space that includes "processed" content. Assume, for example, that multiple audio files are to be used in the production of a media compilation. In such a scenario, those audio files may initially be uploaded into the first space and then transferred into the second space upon being converted into studio sound files in accordance with the approach described herein.

A user could manually associate an audio file with a preexisting transcript when the audio file is uploaded to the media production platform. Alternatively, the media production platform could automatically associate an audio file with a preexisting transcript based on, for example, a comparison of words recognized in the audio file to a series of preexisting transcripts. As noted above, the media production platform may automatically generate a transcript responsive to receiving the audio file and then post the transcript to the interface for review by the individual. For example, the media production platform may create a transcript upon determining that a transcript does not already exist for an acquired audio file. If a transcript is uploaded to the media production platform (or written using the interface) and no corresponding audio file(s) exist, the media production platform may automatically generate voice-like scratch audio that can be used to test aspects of a media compilation, such as expected runtime, flow, and the like.

Each file that is accessible to the media production platform may be independently editable using the interfaces shown in FIGS. 3A-G. However, a user may also be able to easily switch between various files while producing a media compilation. As shown in FIGS. 3D-E, the individual could select a segment of a transcript 316 (e.g., by selecting a portion of the transcript 316 or the corresponding audio waveform), copy the segment, and then paste the segment into another transcript, another location in the transcript 316, etc.

Corresponding content may also be transferred based on the single action performed by the individual. For example, the selection of the segment of the transcript 316 may prompt the media production platform to create an audio segment by clipping a source audio file. If the individual copies segments of a first transcript and then pastes the segments into a second transcript, corresponding portions of a first audio file associated with the first transcript may be used to form a second audio file associated with the second transcript.

Such granular modification of text and audio is enabled by precisely aligning the transcript and corresponding audio file(s). Alignment may occur during pre-processing of the audio file(s), generating of the transcript, etc. When an audio file is provided to the media production platform (e.g., by uploading the audio file through the interface), various speech recognition processes can be performed that enable words spoken in the audio file to be converted into text.

Accordingly, the media production platform may be able to automatically align audio file(s) uploaded by an individual with a preexisting transcript by detecting the presence of certain words or phrases. These words or phrases may be referred to as "keywords" or "keyphrases" as they enable alignment to be accomplished much more easily. In some embodiments, the media production platform is able to automatically stack multiple utterances of the same phrase upon detecting a single occurrence of the phrase in the preexisting transcript. That is, a speaker may be able to record one or more takes over a preexisting script. Multiple occurrences of the same phrase are often indicative of multiple takes of the same line of dialogue by a voice actor. The media production platform may be configured to facilitate the initiation of playback of the multiple takes, the selection of a given take, etc.

The media production platform can create a transcript based on the spoken words recognized in an audio file. Moreover, the media production platform can parse the recognized words and align the words with the corresponding portions of the audio file on a phoneme level or a word level. Consequently, audio waveforms can be readily modified by the media production platform based on changes to the transcript, and vice versa. Note, however, that even if the transcript is not identical to the audio file (e.g., the transcript includes errors, or the speaker has not uttered words in the transcript), alignment can still be performed to determine a best fit for the audio file within the transcript based on context.

Figure 3F:
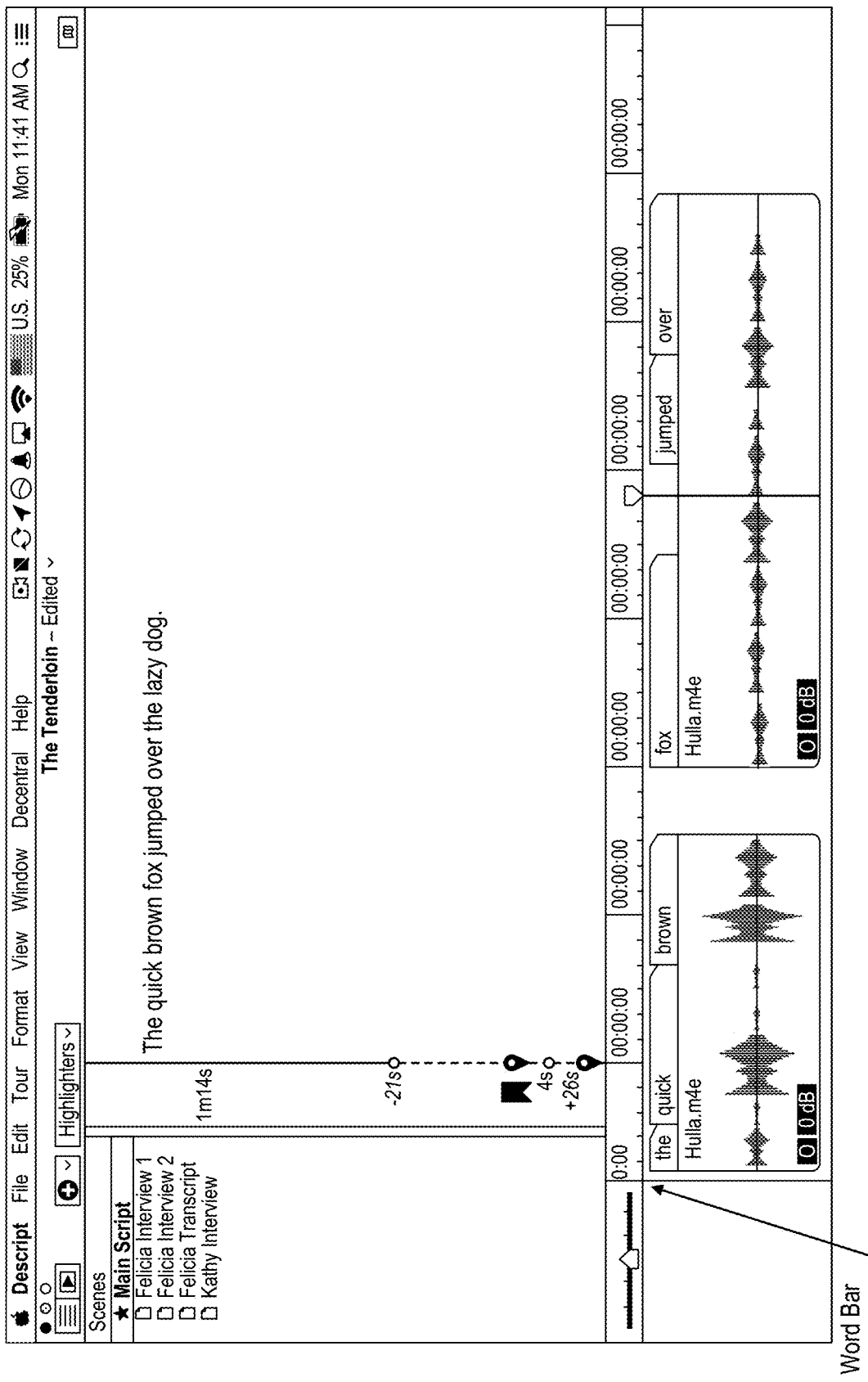
FIG. 3F depicts an example of an interface that includes a word bar, which allows an individual to directly manipulate words via a waveform editor window.

As shown in FIG. 3E, users may be able to modify the transcript 316 directly. Here, a user has added text ("Keep walking straight.") directly into the transcript 316. In some embodiments, modifications to the transcript 316 are visually highlighted in some manner. For example, newly added text may be highlighted in a particular color to indicate that audio must still be recorded for that text. In such instances, if the user elects to play the transcript (e.g., for testing purposes), a voice generator program may read the newly added text so as to not interrupt the flow of the media-based experience. Examples of modifications include additions of new text, removals of existing text, and changes to existing text. As shown in FIG. 3F, some interfaces include a word bar 318 that visually represents the individual words in an audio file. The media production platform may automatically populate the word bar 318 after parsing the audio file to recognize spoken words. Each word in the word bar 318 may be aligned with a corresponding portion of an audio waveform corresponding to the audio file and/or a timeline. Users may be able to directly manipulate the audio file by manipulating the words in the word bar 318, eliminate gaps in the audio file by manipulating the audio waveform, create gaps in the audio file by manipulating the audio waveform, etc.

Multiple voices that are simultaneously speaking in an audio file (or a video file) may be separately shown using script section blocks. Such a scenario may be referred to as "crosstalk."

As shown in FIG. 3G, multiple takes of the same line of dialogue may be displayed in a similar manner. Here, for example, there are seven different takes 322 of a line of dialogue 320. These takes 322 are contemporaneous in nature. That is, all of the takes occur at the same point in time during a media-based experience. Accordingly, a consumer of the media-based experience will likely only experience a single take. However, developers may want to see how the different takes affect flow, runtime, etc.

Playheads may be used to represent position while producing, reviewing, or viewing content. For example, multiple playheads could be used for those takes that share words or phrases in common. While playheads are normally illustrated as vertical lines embedded within the text, other visual indicia may be used. For example, words may be highlighted in a particular color as they are presented during playback of a take by the media production platform.

Mitigating Noise Through Trained Manipulation of Audio Signals

"Rich" recordings in which the speech uttered by speakers is recorded largely, if not entirely, without noise are useful in various contexts as mentioned above. However, accessing the sophisticated equipment that allows for "rich" recordings can be impractical or impossible for many speakers whose speech is to be recorded. Consider, for example, a podcast that is representative of recordings which are merged together. These recordings may include speech uttered by multiple speakers (e.g., an interviewer and interviewee) who are located in different geographical locations. These speakers may not be able to easily access sophisticated equipment, and as such, may resort to generating their respective recordings using less sophisticated equipment.

To ensure that the quality of the podcast is sufficiently high, steps may be taken afterwards to improve these recordings. This stage—commonly referred to as "post-processing" may involve discovering the noises in each recording and then filtering, dampening, or otherwise modifying the noises. While this approach can lessen the impact of the noises, it will be audibly apparent that these processed recordings were not generated with sophisticated equipment. Notably, in comparison to recordings generated with sophisticated equipment, these processed recordings are generally less sharp in the sense that there tends to be noticeable bleeding between words.

Introduced here are computer programs and associated computer-implemented techniques for manipulating noisy audio signals to produce clean audio signals that are sufficiently high quality so as to be largely, if not entirely, indistinguishable from "rich" recordings. As further discussed below, when a noisy audio signal is obtained by a media production platform, the noisy audio signal can be manipulated to sound as if recording occurred with sophisticated equipment. Because the clean audio signals are intended to mimic recordings generated in recording studios, the clean audio signals may be referred to as "studio sound files" or "studio audio files."

To generate clean audio signals, the media production platform may implement several concepts. First, the media production platform can utilize a "flipped vocoder" approach in which an inverse vocoder is concatenated with a vocoder in a machine learning framework that is representative of a model. At a high level, when applied to a noisy audio signal, the model can transform the noisy audio signal into a spectrogram and then transform the spectrogram into the clean audio signal. Second, the media production platform can train the model to mitigate noise by learning the characteristics of noise signals with little or no noise. Third, the media production platform can intelligently simulate recording in different environments. As further discussed below, these simulated recordings can be used to train the model, such that the model is able to learn the characteristics of clean audio signals. Each of these concepts is discussed in greater detail below.

A. Generating Models Using Software-Implemented Vocoders

FIG. 4A depicts a flow diagram of a process 400 for generating a model that can be used to improve the quality of audio signals that contain speech. Initially, a media production platform may receive input indicative of an instruction to generate the model (step 401). For example, the media production platform may create an interface through which a user is able to indicate that she would like the model to be generated. In some embodiments, the user may indicate that she would like the model to be generated in an explicit manner. For example, the user may select a graphical element labeled "Generate Model." In other embodiments, the user may indicate that she would like the model to be generated in an implicit manner. For example, the user may select a graphical element labeled "Apply Model," and the media production platform may determine that no model exists. As another example, the user may specify or upload a noisy audio signal for analysis, and the media production platform may determine that no model exists.

Alternatively, the media production platform may automatically generate the model. Assume, for example, that the media production platform receives input indicative of an intent or request to include an audio signal in a media compilation. In such a scenario, the media production platform may examine the audio signal to ensure that its quality is sufficiently high for inclusion on the media compilation. Quality may be determined based on noise loudness, signal-to-noise ("SNR") ratio, or another metric that is representative or indicative of quality. To determine whether quality is sufficiently high, the media production platform may compare the quality metric to a predetermined threshold. For the purpose of illustration, assume that the quality metric is SNR ratio. In response to a determination that the SNR ratio exceeds the predetermined threshold, the media production platform may permit the audio signal to be included in the media compilation. However, in response to a determination that the SNR ratio does not exceed the predetermined threshold, the media production platform may automatically initiate the process 400 by which a model is created (or the process 800 of FIG. 8 by which a model is applied, as further discussed below) without requiring an explicit request from the user to do so.

As mentioned above, the media production platform can utilize a "flipped vocoder" approach to generate the model. Thus, the media production platform may obtain a vocoder that is able to transform a frequency representation of an audio signal into a corresponding waveform (step 402). The vocoder may be implemented as one or more algorithms—usually embodied as an instruction set—that, when executed, obtain the frequency representation and then converts the frequency representation into the corresponding waveform. The frequency representation may be a spectrogram (e.g., a mel spectrogram) that tracks energies of the audio signal at audible frequencies over time. Additionally or alternatively, the vocoder could be designed to utilize other features like linguistic information, speaker identity, and the like.

The media production platform can then generate, based on the vocoder, an inverse vocoder that is able to transform a waveform into a frequency representation of a corresponding audio signal (step 403). At a high level, the media production platform can "flip" the vocoder around, such that the inverse vocoder takes the waveform as input and then outputs the frequency representation. Like the vocoder, the inverse vocoder may be implemented as one or more algorithms. However, when executed, these algorithm(s) obtain the waveform and then converts the waveform into the frequency representation of the corresponding audio signal. Again, the frequency representation may be a spectrogram (e.g., a mel spectrogram) that tracks energies of the corresponding audio signal at audible frequencies over time.

The media production platform can then concatenate the inverse vocoder and vocoder together. More specifically, the media production platform can concatenate the inverse vocoder and vocoder in a machine learning framework, so as to generate the model (step 404). As an example, the machine learning framework may be representative of a GAN that includes (i) a first neural network that is representative of the inverse vocoder and (ii) a second neural network that is representative of the vocoder. As further discussed below, the first neural network may be designed and then trained to transform waveforms into frequency representations, and the second neural network may be designed and then trained to transform frequency representations into waveforms. When concatenated together, the first and second neural networks may form a larger model (also called a "superset model") that is able to take a first waveform as input, convert the first waveform into a frequency representation, and then convert the frequency representation into a second waveform. Thus, the output produced by the first neural network—namely, the frequency representation (e.g., spectrogram)—can be provided to the second neural network as input. The nature of the first and second models is not particularly important, and models other than neural networks could be selected or utilized by the media production platform.

In some embodiments, the media production platform stores the model—in its untrained form—in a memory (step 405). In other embodiments, the media production platform trains the model before it is stored in the memory. Assume, for example, that the model is representative of a GAN that comprises a pair of neural networks. In such a scenario, the media production platform can train the model in an adversarial manner as further discussed below.

FIG. 4B includes a high-level illustration that shows how a model 452—like the one generated in accordance with the process 400 of FIG. 4A—can take a first audio signal as input and produce a second audio signal with higher quality as output. As shown in FIG. 4B, a media production platform 450 may obtain a first audio signal (here, called "Audio Signal A") for which the quality is to be improved. The first audio signal could originate within the media production platform 450, or within the computing device on which the media production platform 450 is executing. For example, in embodiments where the media production platform 450 is executing on a mobile phone (e.g., in the form of a mobile application) or a laptop computer (e.g., in the form of a desktop application), the first audio signal could be recorded using an audio input mechanism (e.g., a microphone) that is part of, or connected to, the mobile phone or laptop computer. As another example, the media production platform 450 could retrieve the first audio signal from the memory of the computing device on which it is executing. Alternatively, the media production platform 450 may acquire, retrieve, or otherwise obtain the first audio signal from a source external to the computing device on which it is executing. For example, in embodiments where the media production platform is executing on a computer server, the first audio signal could be received from another computing device (e.g., a mobile phone or laptop computer) that either generates the first audio signal or receives the first audio signal from a peripheral device, such as a webcam or microphone.

Regardless of its source, the media production platform 450 can apply the model 452 to the first audio signal. As shown in FIG. 4B, application of the model 452 may cause the first audio signal to be provided to an inverse vocoder 454 as input. At a high level, the first audio signal may "enter" the inverse vocoder 454 and then exit in the form of a latent space representation (or simply "latent representation"). The latent representation may contain all of the important information needed to represent the original datapoint, namely, the first audio signal, but be lower dimensional than the original datapoint. Accordingly, the latent representation may represent latent variables (also called "latent features" or simply "features") of the original datapoint. Thus, the inverse vocoder 454 may be trained to learn the features of audio signals that are provided as input and simply the representation in order to make the audio signals easier to manipulate. Examples of latent representations include spectrograms and embeddings. The latent representation may be trained jointly with both the inverse vocoder 454 and vocoder 456, allowing for higher quality. The latent representation can then be provided to the vocoder 456 as input, and the vocoder 456 may produce a second audio signal (here, called "Audio Signal B") as output. In comparison to the first audio signal, the second audio signal may have a higher quality, for example, through reduction of noise.

B. Training Models to Mitigate Noise

FIG. 5 depicts a flow diagram of a process 500 for developing a trained model that is able to mitigate noise in a noisy audio signal provided as input. Initially, a media production platform can concatenate an inverse vocoder and a vocoder in a machine learning framework, so as to generate an untrained model (step 501). The process for generating an untrained model is discussed in further detail with reference to FIG. 4A. The machine learning framework could take various forms, generally governed by the nature of the inverse vocoder and vocoder. For example, if the inverse vocoder and vocoder are implemented as neural networks, then the machine learning framework may be representative of a GAN.

Then, the media production platform can train the untrained model to mitigate noise in noisy audio signals provided as input through transformation of those noisy audio signals from the time domain into the frequency domain and then back to the time domain (step 502). For the purpose of illustration, assume that the untrained model is representative of a GAN that can be trained in an adversarial manner. In such a scenario, the inverse vocoder may be embodied as one neural network while the vocoder may be embodied as another neural network. To ensure good performance, the media production platform may utilize two losses, namely, an adversarial loss and a reconstruction loss, during training.

The adversarial loss can comprise several discriminators, each of which is in the waveform domain (also called the "time domain"). More specifically, the adversarial loss may comprise a multi-period discriminator and a single-scale discriminator. The multi-period discriminator may consider samples output by the GAN during training at a predetermined frequency. For example, the multi-period discriminator could consider every sample, every third sample, or every fifth sample output by the GAN during training. Meanwhile, the single-scale discriminator may consider every sample output by the GAN during training. While the multi-period discriminator and single-scale discriminator could each consider every sample output by the GAN during training, the adversarial loss normally utilizes one discriminator that considers all samples output by the GAN during training and another discriminator that considers a subset of all samples output by the GAN during training.

Meanwhile, the reconstruction loss may be used by the media production platform to stabilize the training process. The actual function of the reconstruction loss used for training the model may be dependent on the nature of its input and output. For example, the function may differ based on whether the model is designed and then trained to take waveforms or spectrograms as input and produce waveforms or spectrograms as output. As a specific example, the reconstruction loss may be applied to a GAN to not only stabilize training, but also to quicken the pace of training and ensure realistic outputs are produced.

The media production platform may also balance the adversarial and reconstruction losses in a unique manner. More specifically, the media production platform may assign weights to the losses so that each term—namely, the adversarial loss, reconstruction loss, and feature matching loss—contributed equally to the final loss term.

In some embodiments, the media production platform further trains the model to distinguish authentic speech from generated speech, so as to encourage the model to output clean audio signals having high quality. To accomplish this, the media production platform can compare one or more features of the multi-period discriminator with one or more corresponding features of the single-scale discriminator for (i) at least one audio signal that includes authentic speech and (ii) at least one audio signal that includes generated speech. Normally, these audio signals are clean audio signals that are sufficiently devoid of noise, so as to ensure that the model learns to distinguish authentic speech from generated speech with minimal influence by noise. By comparing these feature(s), the multi-period discriminator and single-scale discriminator can learn to distinguish authentic speech from generated speech.

Generally, the media production platform generates and trains the model in advance of receiving input indicating that there is interest in employing the model to improve a noisy audio signal. For example, an administrator who is responsible for managing the media production platform could initiate the processes of FIGS. 4-5, such that a trained model is available for users of the media production platform to apply to noisy audio signals, for example, while producing media compilations. However, the media production platform could generate or train the model "on the fly" in some embodiments. For example, the media production platform may generate or train the model in response to a determination that the model is needed. Such an embodiment is shown in FIG. 6. FIG. 6 depicts a flow diagram of another process 600 for training a model that can be used to improve the quality of audio signals that contain speech. Initially, the media production platform may receive input indicative of a request to mitigate the noise included in a first recording that includes speech uttered by a first speaker (step 601). The first recording may be representative of a noisy audio signal that includes an audible amount of noise.

In response to receiving the input, the media production platform may generate a series of recordings by combining a second recording that includes speech uttered by a second speaker with a noise source in different ways (step 602). Since the second recording is normally representative of a reference recording used for training purposes, the first and second speakers are normally different individuals. However, the first and second speakers could be the same person if a clean audio signal is available for the speaker whose speech is included in the first recording, in which case the clean audio signal may be the second recording.

As discussed above, the series of recordings could be generated by a simulating module that is implemented by, or accessible to, the media production platform. At a high level, the series of recordings may be intended to mimic creation of the second recording in a given physical environment (e.g., a recording studio). This allows the training data used to train the model to be comparable to "rich" recordings from a quality perspective.

In operation, the media production platform can obtain (i) a clean audio signal that is known to include speech and largely, if not entirely, inaudible noise, (ii) a noise source, and (iii) an impulse response that is meant to represent the given physical environment. The noise source may be indicative of an environmental soundscape, room tone, or white noise. Then, the media production platform can filter the noise source and impulse response so as to equalize the noise source and impulse response with the clean audio signal. For example, the media production platform may perform frequency-band filtering on the noise source and impulse response.

In some embodiments, the media production platform also augments the impulse response, for example, to make the impulse response target one or more direct-to-reverberant ratios. Augmentation of the impulse response may allow the clean audio signal to be altered such that it sounds as if it was recorded in a larger or smaller room. By augmenting the impulse response, the media production platform can control the distance between the speaker whose speech is included in the clean audio signal and the virtual microphone at which the clean audio signal is supposedly recorded. Accordingly, the media production platform may be able to augment the impulse response to simulate recording of the speech from nearer or further distances.

Thereafter, the media production platform can convolve the clean audio signal with the impulse response to produce a convolved audio signal. This has the effect of making the speech included in the clean audio signal sound as if it were recorded in the given physical environment that the impulse response is intended to represent. The media production platform can then combine the convolved clean audio signal with the noise source, so as to create a mixed audio signal that can be used for training. Generally, the mixed audio signal is one of multiple mixed audio signals created by the media production platform for training. For example, the media production platform may combine the convolved audio signal with the noise source in different ways, so as to produce a series of mixed audio signals. Each mixed audio signal of the series of mixed audio signals may correspond to the noise source being incorporated at a different decibel level. The series of mixed audio signals may be representative of the series of recordings that can be provided to the model as training data.

In some embodiments, the series of mixed audio signals is created using more than one clean audio signal or more than one noise source in some embodiments. For example, the media production platform could combine the convolved audio signal with a series of noise sources, so as to produce a series of mixed audio signals. In such a scenario, each mixed audio signal in the series of mixed audio signals may correspond to a different noise source in the series of noise sources. As another example, the media production platform could combine the noise source with a series of convolved clean audio signals. In such a scenario, each convolved clean audio signal may be created by convolving the same impulse response against each of a series of clean audio signals. Combinations of these approaches may also be suitable. Thus, the mixed audio signals produced by the media production platform that are to serve as training data could be associated with more than one clean audio signal or more than one noise source.

Note that while this process for generating training data is described in the context of FIG. 6, a similar approach could be used to develop the training data that is needed to train the model as discussed with reference to FIG. 5.

The media production platform can then train a model to mitigate noise in noisy audio signals that are provided as input by providing the series of recordings to the model as training data (step 603). Generally, the second recording is also provided to the model as training data. Training the model in such a manner causes the model to learn characteristics of recordings with largely, if not entirely, inaudible amounts of noise. Said another way, this approach may cause the model to learn the characteristics of recordings with little or no noise. The actual training mechanism may depend on the nature of the model and its underlying machine learning architecture. For example, if the model is a GAN, as discussed above, then training may cause the GAN to learn, in an adversarial manner, the characteristics of recordings with little or no noise. Then, when applied to a noisy audio signal, the GAN can manipulate its characteristics so as to emulate the characteristics of recordings with little or no noise. Application of the model is discussed in greater detail below.

Then, the media production platform can store the trained model in a memory (step 604). For example, the media production platform may store the trained model in a data structure that includes a series of trained models, each of which is trained with different training data. Accordingly, the media production platform may generate and store trained models associated with different training data. These trained models could be associated with different environments, speakers, noise characteristics, and the like. Thus, the media production platform may maintain trained models that are tailored for certain scenarios or are personalized for certain speakers. Those skilled in the art will recognize that the nature of these trained models may vary since different training data is used. Assume, for example, that each trained model is representation of a pair of neural networks arranged such that the output of a first neural network is provided as input to a second neural network. In such a scenario, the relationships or weights of the various layers of the first and second neural networks can vary to account for differences in training data. Thus, a model personalized for a first speaker—and trained using at least one recording of the first speaker—may learn different weights than a model personalized for a second speaker—and trained using at least one recording of the second speaker.

As another example, the media production platform may store the trained model in a data structure associated with a media compilation or user. In some embodiments, the media production platform appends metadata to the trained model or the data structure in which it is stored. The metadata may specify the nature of the training data (e.g., the clean audio signal, noise source, or impulse response used to create the training data), the amount of the training data, the date of training, and the like.

In embodiments where the model is generated or trained in real time, the media production platform may keep one or more individuals apprised of its progress. Assume, for example, that the process 600 of FIG. 6 is initiated in response to a user indicating an interest in using a noisy audio signal in the production of a media compilation. In such a scenario, in response to a determination that the model has been trained, the media production platform may cause transmission of a notification—which specifies that the model has been trained, and therefore is ready to be used—to a computing device associated with the user. Notifications may also be used in embodiments where the model is not generated or trained in real time. For example, the processes 400, 500 of FIGS. 4-5 may be initiated in response to an individual submitting input that indicates a trained model is desired. This individual may be an administrator who is responsible for managing the media production platform, rather than a user who is interested in utilizing the media production platform to produce a media compilation. In such a scenario, the media production platform may still notify the administrator in response to a determination that the model has been generated or trained. For example, the media production platform may cause transmission of a notification—which specifies that the model has been generated or trained—to a computing device associated with the administrator. Receipt of this notification may prompt the administrator to perform another action (e.g., initiate training of the untrained model, store the trained model in a memory, make the trained model accessible to users of the media production platform).

Note that the process 600 of FIG. 6 could be performed by the media production platform more than once. For example, the media production platform could perform the process 600—or at least parts thereof—in order to train multiple models with different training data. The media production platform could obtain different training data, for example, by using a different second recording or a different noise source in step 602. Accordingly, the model could be trained to replicate a specific recording condition (e.g., in terms of background noise, echo, etc.), rather than a general recording condition, namely, that of clean audio. This approach is called "acoustic transfer," and it can be very useful for media editing tasks like automatic dialogue replacement, where audio that is recorded in a different location is mixed into a compilation in a way that makes the audio sound as if it were recorded "on set."

Consider, for example, a scenario where two individuals are recording audio for the purpose of creating a compilation, such as a podcast, radio segment, television segment, or content to be posted on a social media platform or social media application. A first individual may record herself in a recording studio, while the second individual may record herself in another environment (e.g., a home or office). In such a scenario, a first recording that includes speech uttered by the first individual may be used to generate the series of recordings used for training the model, so that when the trained model is applied to a second recording that includes speech uttered by the second individual, the second recording is altered, modified, or otherwise manipulated so as to sound as if the second individual were recording herself in the recording studio.

A similar approach could be applied if neither individual recorded themselves in a recording studio. Consider the same scenario where two individuals are recording audio for the purpose of creating a compilation. Here, however, the first individual may record herself in a first non-studio environment (e.g., a home or office) while the second individual also records herself in a second non-studio environment (e.g., a home or office). Rather than use the recordings generated by the first and second individuals to generate the series of recordings used for training the model, the media production platform could instead select a recording that is known to have little or no audible noise. This recording may be called the "baseline recording" or "reference recording." In some embodiments the reference recording is associated with either the first individual or the second individual, while in other embodiments the reference recording is associated with another individual. The media production platform may use the reference recording to generate the series of recordings that are used to train the model, which could then be applied by the media production platform to the first recording that includes speech uttered by the first individual and the second recording that includes speech uttered by the second individual. Accordingly, both of the recordings could be upsampled in accordance with the approach described herein.

C. Employing Models to Mitigate Noise in Noisy Audio Signals

FIG. 7 depicts a flow diagram of a process 700 for implementing a model that is designed and trained to mitigate noise in audio signals. Initially, a media production platform can receive input indicative of an intent to use a noisy audio signal that includes speech uttered by a speaker in the production of a media compilation (step 701). For example, a user may interface with the media production platform through an interface as discussed above with reference to FIGS. 1-3G. Through the interface, the user may select the noisy audio signal responsive to a determination that it will be used in the production of a media compilation. Alternatively, the user may upload the noisy audio signal through the interface, thereby indirectly indicating that the noisy audio signal is to be used in the production of a media compilation.

In some embodiments, the media production platform presumes that audio signals selected or uploaded for inclusion in a media compilation are noisy unless otherwise specified by the user. As an example, the media production platform may perform the process 700 for all audio signals that are acquired, retrieved, or otherwise obtained by the media production platform. As another example, the media production platform may perform the process 700 for all audio signals that have been added to a media compilation. For instance, in response to a determination that an audio signal has been selected for inclusion in a media compilation (e.g., by the user via one of the interfaces shown in FIGS. 3A-G), the media production platform may perform the process 700 regardless of how noisy the audio signal is.

In other embodiments, the media production platform determines whether audio signals to be used in the production of a media compilation are noisy, and therefore suitable for manipulation. For example, the media production platform may examine each audio signal that is acquired, retrieved, or otherwise obtained by the media production platform, so as to determine whether quality of that audio signal corresponds to a programmed threshold or range. As a specific example, the media production platform may establish the noise level of each audio signal, such that the process 700 is performed only for those audio signals in which the noise level is in the audible range. The audible range generally extends from roughly 20 hertz to roughly 20 kilohertz, though those lower and upper bounds could be adjusted so that the media production platform manipulates a lesser or greater number of audio signals.

The media production platform can then obtain the noisy audio signal (step 702). In some embodiments, the noisy audio signal is included in the input. For example, the user may upload the noisy audio signal to the media production platform through an interface as discussed above, and the act of uploading the noisy audio signal may be indicative of the input. In other embodiments, the noisy audio signal is referenced in the input. For example, the input may reference the name of the noisy audio file, a speaker whose voice is included in the noisy audio file, or a media compilation in which the noisy audio signal is to be incorporated. As another example, the input may be indicative of a selection of the noisy audio signal from amongst files that are managed by, or accessible to, the media production platform. In embodiments where the noisy audio signal is referenced in the input, the media production platform can retrieve the noisy audio signal from a memory. The memory may be included in the same computing device as the media production platform, or the memory may be included in a different computing device than the media production platform.

Thereafter, the media production platform can apply, to the noisy audio signal, a model that is trained to mitigate noise (step 703). The model may be designed and then trained in accordance with the processes 400, 500, 600 of FIGS. 4-6. While the model can take various forms, it should be able to transform the noisy audio signal from the time domain into the frequency domain and then back into the time domain. One way to accomplish this is by using (i) an inverse vocoder that is able to transform the noisy audio signal from the time domain to the frequency domain, so as to produce a spectrogram and (ii) a vocoder that is able to transform the spectrogram from the frequency domain to the time domain, so as to produce another audio signal. Through these transformations, the model can manipulate characteristics of the noisy audio signal to emulate the characteristics of the clean audio signals. This other audio signal produced by the vocoder may be representative of a clean version of the noisy audio signal to which the model is applied. For simplicity, the clean version of the noisy audio signal may be referred to as a "clean audio signal."

At a high level, the inverse vocoder may be implemented as algorithm(s) that, when executed, transform the noisy audio signal into a spectrogram that tracks energies of the noisy audio signal at audible frequencies over time, while the vocoder may be implemented as algorithm(s) that, when executed, transform the spectrogram into the clean audio signal. As discussed above, the inverse vocoder and vocoder can be trained to learn the characteristics of audio signals that are largely, if not entirely, devoid of audible noise. Accordingly, these transformations from the time domain to the frequency domain and vice versa may be performed in an intelligent manner, as the clean audio signal produced as output is manipulated to mimic those clean audio signals that are used for training.

The media production platform can then store the clean audio signal in a memory (step 704). For example, the clean audio signal may be stored in a data structure that is associated with the media compilation in which it is to be incorporated. Alternatively, the clean audio signal may be stored in a data structure that is generally accessible to the media production platform (e.g., from which users can select audio files for inclusion in media compilations).

In some embodiments, the media production platform causes display of a notification that indicates the model has output the clean audio signal (step 705). Assume, for example, that the process 700 is initiated in response to a user indicating, through an interface, that she is interested in including the noisy audio file in a media compilation. In such a scenario, the media production platform may cause display of the notification on the interface, thereby alerting the user that the clean audio file is ready for inclusion in the media compilation. Said another way, the media production platform may cause digital presentation of the notification in a manner that alerts the user that the clean audio file is ready for inclusion in the media compilation. The media production platform may permit playback of the noisy audio signal, clean audio signal, or both audio signals through the interface. Accordingly, the user may be able to audibly review manipulation performed by the model applied by the media production platform to ensure that relevant content (e.g., speech) was not inadvertently altered.

FIG. 8 includes a flow diagram of a process 800 for implementing a machine learning framework that is representative of a model to mitigate noise in a noisy audio signal. Initially, a media production platform can determine that a noisy audio signal that includes speech uttered by a speaker is to be included in a media compilation (step 801). For example, the media production platform may receive input indicative of an indication of a selection of the noisy audio signal, in which case the media production platform may acquire the first audio signal from a memory that is internal or external to the computing device on which the media production platform is executing. As another example, the media production platform may infer that the noisy audio signal is to be included in the media compilation in response to a determination that the noisy audio signal was uploaded through an interface that is generated or supported by the media production platform.

Then, the media production platform can apply a machine learning framework to the noisy audio signal, so as to produce a cleaner version of the noisy audio signal that has less noise (step 802). The machine learning framework may be applied by the media production platform in response to determining that the noisy audio signal is to be included in the media compilation. Said another way, step 802 may be performed in response to step 801. Generally, this cleaner version of the noisy audio signal is representative of a clean audio signal that is substantially devoid of audible noise. As discussed above, the machine learning framework may include multiple models that are responsible for performing different tasks. For example, the machine learning framework may include (i) a first neural network that is trained to transform the noisy audio signal from the time domain to the frequency domain, so as to produce a spectrogram and (ii) a second neural network that is trained to transform the spectrogram output by the first neural network from the frequency domain to the time domain, so as to produce the clean audio signal. In some embodiments, the machine learning framework is representative of a GAN, and in such embodiments, the first and second neural networks may be trained in an adversarial manner to learn to manipulate noisy audio signals to emulate the characteristics of clean audio signals learned through training.

The media production platform can then permit the clean audio signal to be included in the media compilation (step 803). For example, the media production platform may allow interaction with the clean audio signal through the interfaces shown in FIGS. 3A-G. As another example, the media production platform may store the clean audio signal in a storage space from which audio signals can be retrieved for inclusion in media compilations.

Other steps could also be performed. For example, the media production platform may determine, based on an analysis of the noisy audio signal, whether loudness of the noise included in the noisy audio signal is above a programmed threshold (e.g., in terms of decibels). The media production platform may apply the machine learning framework in response to a determination that the loudness of the noise is above the predetermined threshold. As another example, the media production platform may determine, based on an analysis of the noisy audio signal, whether signal-to-noise ratio is below a programmed threshold. The media production platform may apply the machine learning framework in response to a determination that the signal-to-noise ratio is below the programmed threshold.

The steps of the processes described herein could be performed in various sequences and combinations. As an example, assume that the media production platform is able to access a memory in which multiple audio signals are stored. The media production platform may not know whether these audio signals are noisy or clean. As such, the media production platform may determine whether a noise-related characteristic matches a parameter for each of the multiple audio signals. For example, the media production platform may determine whether loudness of the noise is above a programmed threshold, or the media production platform may determine whether signal-to-noise ratio is below a programmed threshold. The media production platform may apply a model to those audio signals for which the noise-related characteristic (e.g., loudness or signal-to-noise ratio) indicates sufficient noisiness to benefit from manipulation by the model. As discussed above, upon being applied to an audio signal, the model can manipulate the audio signal so as to emulate at least one characteristic of clean audio signals that is learned through training.

Processing System

Figure 9:
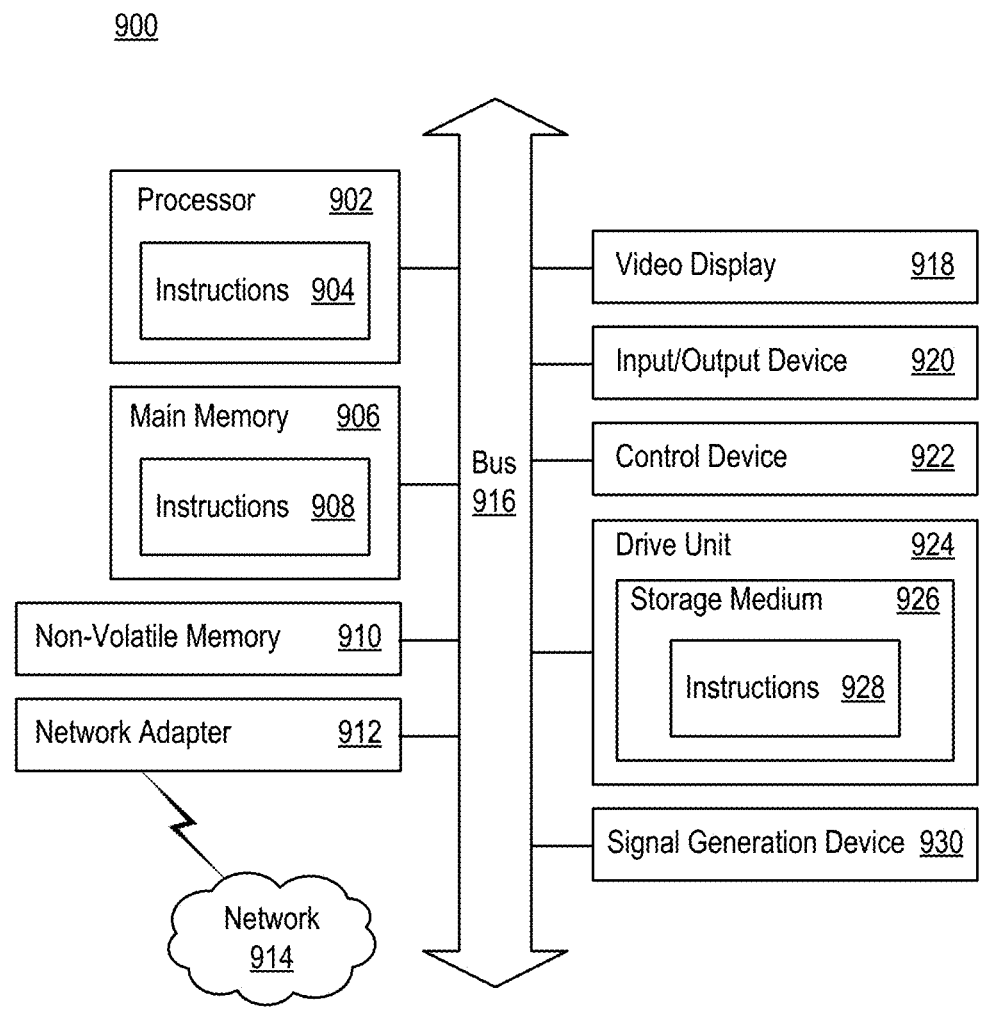
FIG. 9 is a block diagram illustrating an example of a processing system that can implement at least some of the operations described herein.

FIG. 9 is a block diagram illustrating an example of a processing system 900 in which at least some operations described herein can be implemented. For example, components of the processing system 900 may be hosted on a computing device on which a media production platform executes, or components of the processing system 900 may be hosted on a computing device with which the media production platform is accessed.

The processing system 900 may include a processor 902, main memory 906, non-volatile memory 910, network adapter 912 (e.g., a network interface), video display 918, input/output device 920, control device 922 (e.g., a keyboard, pointing device, or mechanical input such as a button), drive unit 924 that includes a storage medium 926, or signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, Peripheral Component Interconnect ("PCI") bus, PCI-Express bus, HyperTransport bus, Industry Standard Architecture ("ISA") bus, Small Computer System Interface ("SCSI") bus, Universal Serial Bus ("USB"), Inter-Integrated Circuit ("I²C") bus, or bus compliant with Institute of Electrical and Electronics Engineers ("IEEE") Standard 1394.

The processing system 900 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 900.

While the main memory 906, non-volatile memory 910, and storage medium 926 are shown to be a single medium, the terms "storage medium" and "machine-readable medium" should be taken to include a single medium or multiple media that stores one or more sets of instructions 928. The terms "storage medium" and "machine-readable medium" should also be taken to include any medium that is capable of storing, encoding, or carrying a set of instructions for execution by the processing system 900.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memories and storage devices in a computing device. When read and executed by the processor 902, the instructions cause the processing system 900 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile and non-volatile memory devices 910, removable disks, hard disk drives, optical disks (e.g., Compact Disk Read-Only Memory ("CD-ROMs") and Digital Versatile Disks ("DVDs")), cloud-based storage, and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi).

The technology introduced here can be implemented using software, firmware, hardware, or any combination thereof. For example, aspects of the present disclosure may be implemented using special-purpose hardwired (i.e., non-programmable) circuitry in the form of ASICs, programmable logic devices ("PLDs"), field-programmable gate arrays ("FPGAs"), and the like.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the art to understand the claimed subject matter, the various embodiments, and the various modifications that are suited to the particular uses that are contemplated.

Although the Detailed Description describes various embodiments, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A non-transitory medium with instructions stored thereon that, when executed by a processor of a computing device, cause the computing device to perform operations comprising:
   receiving an input indicative of an instruction to produce a model that is able to mitigate noise in recordings provided as input;
   obtaining a first neural network that is representative of a software-implemented vocoder and that is able to transform a frequency representation of an audio signal into a corresponding waveform;
   generating, based on the software-implemented vocoder, a second neural network that is representative of an inverse software-implemented vocoder and that is able to transform a waveform into a frequency representation of a corresponding audio signal;
   concatenating the first neural network and the second neural network in a machine learning framework that is representative of the model; and
   storing the model in a memory.

2. The non-transitory medium of claim 1, wherein the first neural network is implemented as one or more algorithms that, when executed by the processor, obtain a spectrogram that tracks energies of the audio signal at audible frequencies over time and then converts the spectrogram into the corresponding waveform.

3. The non-transitory medium of claim 1, wherein the second neural network is implemented as one or more algorithms that, when executed by the processor, obtain the waveform and then converts the waveform into a spectrogram that tracks energies of the corresponding audio signal at audible frequencies over time.

4. The non-transitory medium of claim 1, wherein the operations further comprise:
   receiving a second input indicative of an instruction to mitigate noise in a first waveform that is representative of a recording; and
   applying the model to the first waveform, so as to produce a second waveform that includes less noise than the first waveform.

5. The non-transitory medium of claim 4, wherein upon being applied to the first waveform, the model transforms the first waveform into a spectrogram using the second neural network and then transforms the spectrogram into the second waveform using the first neural network.

6. The non-transitory medium of claim 1, wherein the machine learning framework is representative of a generative adversarial network, and wherein the operations further comprise:
   training the generative adversarial network by providing a series of recordings to the generative adversarial network as training data.

7. The non-transitory medium of claim 6, wherein the operations further comprise:
   obtaining (i) a clean audio signal that is known to include speech and is substantially devoid of audible noise, (ii) a noise source, and (iii) an impulse response that is meant to represent a physical environment;
   filtering the noise source and the impulse response to equalize the noise source and the impulse response with the clean audio signal;
   convolving the clean audio signal with the impulse response to produce a convolved audio signal; and
   combining the convolved audio signal with the noise source in different ways to produce the series of recordings.

8. The non-transitory medium of claim 7, wherein said convolving causes speech in the clean audio signal to sound as if the speech were recorded in the physical environment represented by the impulse response.

9. A method comprising:
   receiving, by a processor, input indicative of a request to mitigate noise included in a first recording that includes speech uttered by a first speaker;
   generating, by the processor in response to said receiving, a series of recordings by combining a second recording that is substantially devoid of noise and includes speech uttered by a second speaker with a noise source in different ways; and
   training, by the processor, a generative adversarial network to mitigate noise in recordings provided as input by providing the series of recordings to the generative adversarial network as training data,
      wherein the generative adversarial network is represented by a machine learning framework constructed by concatenating (i) a first neural network that is representative of a vocoder and (ii) a second neural network that is representative of an inverse vocoder.

10. The method of claim 9, further comprising:
    applying, by the processor, the generative adversarial network to the first recording, so as to produce a third recording with less noise than the first recording.

11. The method of claim 10, wherein said training causes the generative adversarial network to learn, in an adversarial manner, characteristics of recordings that have little or no noise.

12. The method of claim 11, wherein said applying causes the first recording to be manipulated so as to emulate the characteristics of the recordings that have little or no noise.

13. The method of claim 9, further comprising:
    storing, by the processor, the generative adversarial network in a database that includes a series of generative adversarial networks, each of which is trained with different training data.

14. The method of claim 13, wherein each generative adversarial network in the series of generative adversarial networks is associated with a different one of a series of speakers.

15. The method of claim 9, further comprising:
    causing, by the processor, transmission of a notification to a computing device that specifies that the generative adversarial network has been trained.

16. The method of claim 15, wherein the computing device is associated with an individual who indicated an interest in using the first recording in a media compilation.

17. A non-transitory medium with instructions stored therein that, when executed by a processor of a computing device, cause the computing device to perform operations comprising:
    concatenating a first neural network that is representative of an inverse vocoder and a second neural network that is representative of a vocoder in a machine learning framework that is representative of a generative adversarial network, such that outputs produced by the first neural network are provided to the second neural network as input; and
    training the generative adversarial network to mitigate noise in recordings through transformation of corresponding audio signals from a time domain into a frequency domain and then back to the time domain.

18. The non-transitory medium of claim 17, wherein an adversarial loss and a reconstruction loss are utilized during training.

19. The non-transitory medium of claim 18, wherein the adversarial loss comprises
    (i) a multi-period discriminator that considers samples output by the generative adversarial network during training at a predetermined frequency, and
    (ii) a single-scale discriminator that considers each sample output by the generative adversarial network during training.

20. The non-transitory medium of claim 19, wherein the instructions further cause the computing device to:
    compare a feature of the multi-period discriminator against a corresponding feature of the single-scale discriminator for
       (i) at least one audio signal that is substantially devoid of noise and includes authentic speech and
       (ii) at least one audio signal that is substantially devoid of noise and includes generated speech.

21. The non-transitory medium of claim 20, wherein said comparing causes the multi-period discriminator and the single-scale discriminator to learn to distinguish the authentic speech from the generated speech.

* * * * *